(12) United States Patent
Hormann et al.

(10) Patent No.: US 6,250,155 B1
(45) Date of Patent: Jun. 26, 2001

(54) METHOD AND DEVICE FOR BALANCING ROTORS

(75) Inventors: Dionys Hormann, Darmstadt/Eberstadt; Andreas Harborth, Griesheim, both of (DE)

(73) Assignee: Hofmann Mess und Auswuchttechnik GmbH & Co., Pfungstadt (DE)

( * ) Notice: Subject to any disclaimer, the term of this patent is extended or adjusted under 35 U.S.C. 154(b) by 0 days.

(21) Appl. No.: 09/214,488

(22) PCT Filed: May 23, 1998

(86) PCT No.: PCT/EP98/03049

§ 371 Date: Jan. 5, 1999

§ 102(e) Date: Jan. 5, 1999

(87) PCT Pub. No.: WO98/53291

PCT Pub. Date: Nov. 26, 1998

(30) Foreign Application Priority Data

May 23, 1997 (DE) .............................. 197 25 503

(51) Int. Cl.[7] ................ G01M 1/26; B23C 9/00
(52) U.S. Cl. ............................ 73/462; 409/131
(58) Field of Search ................ 73/460, 462, 466, 73/468, 469, 470, 482, 483, 476; 409/131, 141; 408/143

(56) References Cited

U.S. PATENT DOCUMENTS

| | | | | |
|---|---|---|---|---|
| 4,064,704 | * | 12/1977 | Blackburn | 73/462 |
| 4,480,471 | * | 11/1984 | Kogler et al. | 73/462 |
| 4,489,607 | * | 12/1984 | Park | 73/462 |
| 4,945,763 | * | 8/1990 | Mueller | 73/462 |

FOREIGN PATENT DOCUMENTS

| | | |
|---|---|---|
| 417414 | 3/1991 | (EP) . |
| 2674331 | 9/1992 | (FR) . |
| 4-131540 | 5/1992 | (JP) . |
| 8-254475 | 10/1996 | (JP) . |
| WO 90/11862 | 10/1990 | (WO) . |

* cited by examiner

Primary Examiner—Helen Kwok
(74) Attorney, Agent, or Firm—Reed Smith Hazel & Thomas LLP

(57) ABSTRACT

In the case of a method for balancing rotors, more particularly tool holders of machine tools, the imbalance of the rotor is ascertained in a computer, in terms of size and direction, of a balancing machine and is compensated by spreading at least two balancing elements with a predetermined imbalance into suitable positions of adjustment. Firstly from the measured imbalance of the rotor and the size of the imbalance of the balancing elements the position of adjustment of the balancing elements is determined and then the rotor of the balancing machine is turned until a balanced position is reached, at which the position of adjustment of the one balancing element is at a predetermined position in relation to the balancing machine. When the rotor is located in the balanced position, a visible marking is projected onto the balancing element. The balancing element is then set in its position of adjustment by bringing a mark provided on the balancing element into alignment with the visible marking. The last mentioned steps are repeated for the other balancing element. The apparatus for balancing rotors comprises a marking means, which under the control of the computer projects visible markings on the balancing elements, when the rotor is in a balanced position, at which the position of adjustment of the balancing elements is in a predetermined position in relation to the balancing machine.

27 Claims, 2 Drawing Sheets

METHOD AND DEVICE FOR BALANCING ROTORS

TECHNICAL FIELD

The invention relates to a method for the balancing of rotors and more particularly of tool holders of machining devices, in the case of which the size and direction of an imbalance of the rotor is ascertained in a computer of a balancing machine and balancing is performed by spreading apart at least two balancing elements with a predetermined degree of imbalance by movement into corresponding positions of adjustment.

Furthermore the invention relates to a device for the performance of the method comprising computer operated balancing machine, in which the size and direction of an imbalance of the rotor is ascertained, and comprising at least two balancing elements, by which the imbalance of the rotor is compensated for by spreading apart into corresponding positions of adjustment.

BACKGROUND OF THE INVENTION

Problems in connection with rotor imbalance in machining device such as machine tools are being made more serious by the use of ever increasing speeds of such machining tools, as for example in the case of high speed cutting (HSC). Attempts are frequently made to compensate for undesired imbalance of rotors, which leads to vibrations. One of the known methods produces imbalance compensation with the aid of imbalance correcting rings as disclosed in the patent publication WO 90/11 862.

In the method and apparatus in accordance with this publication WO 90/11 862 two balancing rings are employed in order to correct a lack of balance of a tool holder and tool. The balancing rings are so spread out in their angular position in relation to the tool holder that the imbalance produced by same is equal and opposite to the imbalance of the tool bolder together with the tool. In order to set the spread of the balancing rings scales are provided on the balancing ring, which extend for example from zero to 359° (complete circle) or only from 90 to 180°. The setting of the balancing rings by with the aid of such scales is complicated and leads to misunderstandings during setting the angle of spread. As a rule poorly phrased directions for use and tables are provided, which combine both the spread and also the imbalance to be set on the balancing rings. This means that only persons trained in balancing techniques are able to make use of such directions for use and tables, something also requiring much time. Furthermore such directions for use and tables frequently only relate to certain specific tool holders with tools of the same manufacturer so that this system is inflexible and not sufficiently accurate.

OBJECT OF THE INVENTION

One object of the invention is to provide a method and an apparatus for balancing rotors, and more particularly tool holders of machine (or chip cutting) tools with the purpose of allowing simple, universal and accurate setting of positions of balancing elements without special knowledge of balancing technology.

SUMMARY OF THE INVENTION

For this purpose the method of the invention is characterized in that the positions of adjustment of the balancing elements is determined from the measured imbalance of the rotor and the size of the balancing elements, that the rotor is turned in the balancing machine until a balance position is reached in which the position of adjustment of the one balancing element is at a predetermined position in relation to balancing machine, that a visible marking is projected onto the balancing element, when the rotor is in the balance position, that the balancing element is set in its position of adjustment by bringing a mark provided on the balancing element into alignment with the visible marking and that the last three steps mentioned are repeated for the other balancing element.

For setting the spread of the balancing elements, that is to say for turning the balancing elements into the positions of adjustment, it is thus no longer necessary to have recourse to tables or directions for use. In fact, the visible marking, which is turned on in the balance position of the rotor and is turned off again, when the balance position is left, indicates the point, into which the balancing element must be turned until a mark provided on the balancing element is aligned with the visible marking and accordingly the position of adjustment of the balancing element is reached.

As pairs of balancing elements are utilized having different degrees of imbalance, the degree of imbalance of the respectively employed pair of balancing elements is supplied to the computer. From such data and the imbalance of the rotor the position is then calculated at which the marks of the balancing elements must be set in order to correct the imbalance of the rotor. The marks may for this purpose be arranged at any desired point on the periphery of the balancing elements providing that their position in relation to the maximum imbalance of the balancing element is set in the computer.

Furthermore it is an advantage for the rotation of the rotor into the positions of adjustment to be performed automatically under the control of the computer. Since the information concerning the positions of adjustment is set in the computer, no extra effort will be required in performing the rotation of the rotor and manipulation of the rotor by hand is avoided. Also a failure to find the position of adjustment is avoided because of the rotor being rotated so fast that the turning on of the marking is not able to be discerned.

Furthermore it is an advantage for the visible marking to be produced by a laser, which is controlled by the computer, it being an advantage in this respect for the visible marking to be a line, aligned with the rotor axis, projected onto the rotor. This ensures that the visible marking impinges on the balancing rings even if the same are arranged at different points on the rotor, as for example at different levels above the adapter of the balancing machine. In order to ensure that the visible marking is not overlooked on turning the balancing elements by hand, it is an advantage if the visible marking is caused to flash in a predetermined angular range preceding and following the balance position and in the balance position is presented continuously.

Using the method of the invention it is possible to perform both static balancing in one balancing plane and also dynamic balancing in two balancy planes. For the latter case the steps, which were performed for balancing in the first balancy plane, are repeated for the second balancy plane.

In order to ensure that there are no misunderstandings as to which marking relates to which set of balancy elements when balancing is performed in two planes (dynamically), it is an advantage for the markings for the two balancing planes to be arranged mutually angularly offset, preferably by 60°. In order to provide a further distinction between the two markings it is possible for the markings for the two balancing planes to be in different colors. This ensures that the two sets of balancing elements may be reset to the correct positions of adjustment in the two balancing planes.

The apparatus for performing the method is characterized by a marking device, which under the control of the computer projects visible markings on the balancing elements, when the rotor is located in its balanced[]position at which the positions of adjustment of the balancing elements are in a predetermined position in relation to the balancing machine.

For (dynamic) balancing in two planes it is an advantage to provide one marking device for each balancing plane.

It is an advantage for the balancing elements to be balancing rings, which have a first mark at the point of imbalance. Although as a reference point for the adjustment of the balancing ring it is also possible to use a grub screw, with which the balancing ring may be set in its position, a mark, preferably a marking line, is preferred, because it may then be more accurately performed.

In accordance with an advantageous form of the device the balancing rings possess a second mark, which is offset through 180° in relation to the first mark. This means that the two balancing rings may be more particularly simply set at the zero position, at which the sum of the imbalance of the two balancing rings is equal to zero, in which the mark, in the case of imbalance of the one ring, is brought into alignment with the mark, offset by 180° in relation to the imbalance, of the other ring.

Finally handling of the apparatus is facilitated if the balancing elements have lettering to indicate the maximum size of imbalance of each balancing element or both balancing elements of a pair, preferably in gr-mm.

Further advantageous forms of the invention will be seen from the remaining dependent claims.

Working examples of the invention will now be described with reference to the accompanying drawings

DETAILED DESCRIPTION OF THE INVENTION

Figure 1:
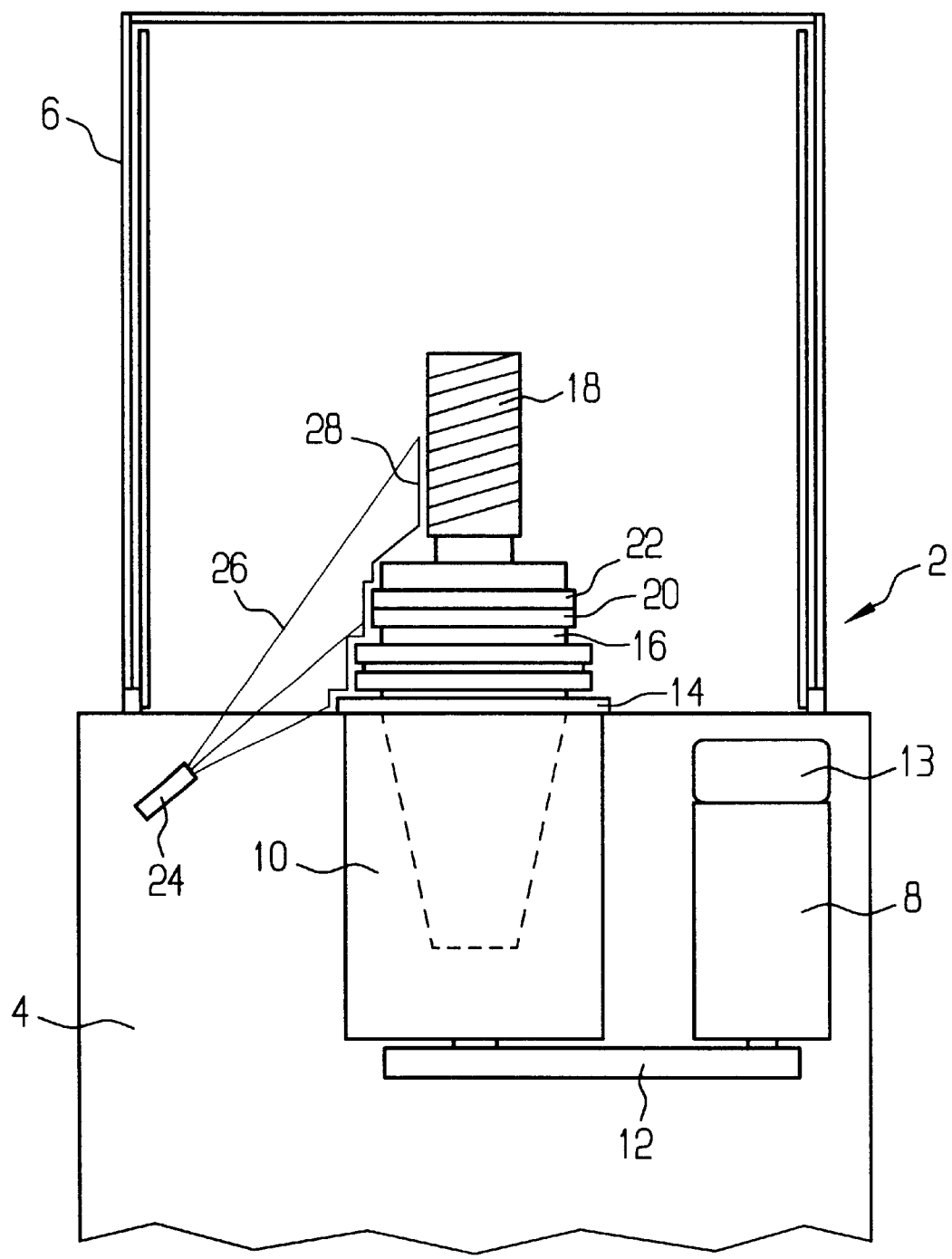
FIG. 1 shows a balancing apparatus with a first embodiment of the invention for the balancing of a rotor in one plane.

In FIG. 1 a balancing machine 2 is represented diagrammatically, having a housing 4 and a guard hood 6. A motor 8 is arranged in the housing 4 and drives a balancing unit 10 via a belt or a chain 12. The angular position of the balancing unit 10 and, respectively, of the balancing spindle is detected by an angle sensor 13. The balancing unit 10 possesses an adapter 14, in which a tool holder 16 with a tool 18 is set. On the tool holder 16 balancing rings 20 and 22 are arranged, which in a known fashion (in accordance with said patent publication WO 90/11 862) are mounted in a rotary manner on the corresponding seat faces on the tool holder and are able to be set with the aid of a grub screw. Finally there is a marking device having a laser 24, whose beam 26 is fanned out at an angle of approximately 30° so that the laser beam projects a line 28 in the field comprising the tool 18, the tool holder 16 and the adapter 14, when as described above, the rotor is located in a balance position. In the case of the above described working example the laser has a red color.

The elements of the balancing machine including the marking device are controlled by computer, which is not illustrated.

Using the balancing machine of FIG. 1 it is possible to perform static balancing, that is to say, balancing plane or a in a plane of compensation, as will be described in the following.

After the rotor and, respectively, the tool holder 16 with the tool 18 have been arranged on the balancing machine, firstly the balancing rings 20 and 22 are brought into the zero position so that the imbalance of the one balancing ring 20 is balanced by the imbalance of the other balancing ring 22.

The next step is the setting of the parameters of the balancing rings employed, that is to say the size of their imbalance, in the computer.

After closing the guard hood 6 the imbalance of the rotor is measured in an imbalance run and the data for the two positions of adjustment of the two balancing rings are calculated and stored.

After the opening of the guard hood 6 the rotor together the balancing spindle are turned by hand until the balance position is reached, in which the position of adjustment of the first balancing ring, for instance the balancing ring 20, is in a predetermined position of the balancing machine, that is to say exactly opposite the laser 24 of the marking device. Then the laser 24 is switched on and a red marking line 28 is so projected onto the rotor that it impinges on the balancing ring 20 as well. If now the rotor is turned too far, either the marking line 28 disappears or the laser means 24 is so switched that the marking line 28 flashes in a range of ±15° preceding and following the balance position and in the balance position itself it appears continuously in order to facilitate location of the balance position.

When the marking line 28 continuously appears, the first balancing ring 20 is turned until the mark on it is aligned with the marking line 28 of the laser 24.

The rotor is then turned a second time by hand or automatically until the balance position is reached at the second position of adjustment of the second balancing ring. In this balance position the marking line 28 appears again and the second balancing ring 22 is so set that its mark is aligned with the marking line 28 of the laser 24.

Accordingly the rotor is balanced in one balancing plane.

Figure 2:
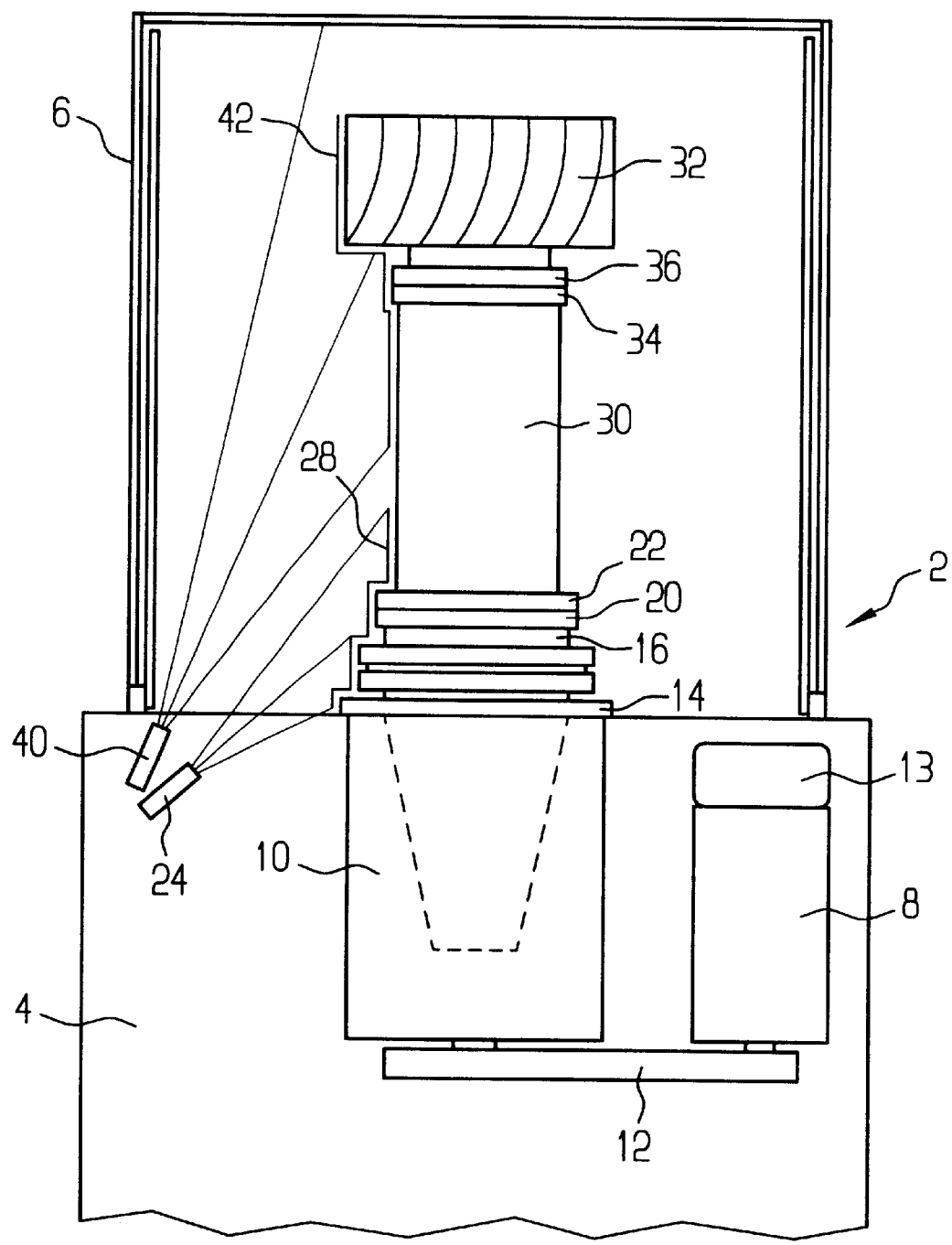
FIG. 2 shows a balancing apparatus in accordance with another working embodiment of the invention in two or more planes.

FIG. 2 shows a balancing machine for balancing a rotor in two planes, i. e. for so-called dynamic balancing. In FIG. 2 the identical parts are given the same reference numerals as in FIG. 1. In FIG. 2 a tool holder 30 is placed in position in the balancing machine 2, which holder in its axial direction is substantially longer than the tool holder 16 in FIG. 1. The tool holder 30 bears a tool 32. It will be seen that in this case it is necessary to balance the tool holder 30 in two planes, namely in the plane of the balancing rings 20 and 22 and additionally in the plane of balancing rings 34 and 36, which are arranged in the vicinity of the tool 32, as explained above in connection with the balancing rings 20 and 22.

In addition to the marking device with the laser device 24 the embodiment of FIG. 2 possesses a further marking means with a laser 40, which like the laser means 24 produces a laser beam with a red color fanned out for 30° directed toward the tool holder, a marking line 42 being projected onto the tool holder, said line being substantially aligned with the axis of rotation of the tool holder 30. Owing to the fanning out of the laser beam it is possible to ensure that the marking line 42 is also present at that point where the balancing rings 34 and 36 are located.

If a tool holder 30 with a tool 32 is to be balanced in two planes, i. e. dynamically, firstly the first plane is balanced using the balancing rings 20 and 22, as has been described above.

Then the rotor is turned a further time until the position of the first balance position for the second balancing plane coincides with the position of the second laser 40, following which the marking line appears for a first balancing ring, as for example the balancing ring 34, in the second balancing plane.

Then the first balancing ring 34 for the second plane is moved until its mark is aligned with the marking line 42 of the laser The rotor is turned a fourth time until the position of the second balanced position coincides with the position of the second laser means and the marking line appears again.

The second balancing ring 36 for the second balancing plane is then adjusted until its corresponding mark is aligned with the marking line 42 of the second laser means 40.

The rotor is now balanced in both planes.

As has been described above, for each balancing plane a marking means 24 and, respectively, 40 is provided. The marking devices for the two planes of balancing may be angularly offset in relation to one another, preferably by 60° in order to ensure that the marking lines 28 and 42 are not confused with each other, when for example the angles of fanning of the two lasers 24 and 40 intersect with each other, because the pairs of balancing rings are closer together than is illustrated in FIG. 2.

A further possibility of distinguishing is for the marking devices or, respectively, the lasers mean to radiate light with different colors.

If as balancing elements balancing rings are utilized, such rings will have a first mark at the position of imbalance and a second mark, which is offset by 180° from the first mark. This simplifies both the computing operation for the determination of the balance position and also the zero adjustment of the balancing rings at the start of the balancing operation.

Lastly it is possible for the balancing ring to bear lettering indicating the maximum size of imbalance of a balancing ring or of both balancing rings of a pair, such indication preferably being in gr-mm. This facilitates the input of the respective data to the computer prior to the balancing operation.

What is claimed is:

1. A method for balancing rotors comprising tool holders and/or tools of machining devices, in the case of which the size and direction of an imbalance of the rotor is ascertained in a computer of a balancing machine and balancing is performed by spreading apart a first and a second balancing element with a predetermined degree of imbalance by movement into corresponding positions of adjustment, wherein:

(a) the size of the imbalance of the respectively employed pair of balancing elements is supplied to the computer;

(b) from the measured imbalance of the rotor and the size of the imbalance of the balancing elements the positions of adjustment of the balancing elements is ascertained;

(c) the rotor is turned in the balancing machine until a first balance position is reached, at which the adjustment position of the first balancing element is at a predetermined position in relation to the balancing machine;

(d) a first visible marking is projected onto the first balancing element, when the rotor is located in the first balance position;

(e) the first balancing element is set in a position of adjustment by bringing a mark provided on the balancing element into alignment with the first visible marking; and wherein (f) the rotor is again taned in the balancing machine until a second balance position is reached, at which the adjustment position of the second balancing element is at a predetermined position in relation to the balancing machine;

(g) a second visible marking is projected onto the second balancing element, when the rotor is located in the second balance position;

(h) the second balancing element is set in a position of adjustment by bringing a mark provided on the second balancing element to alignment with the second visible marking.

2. The method as claimed in claim 1, wherein rotation of the rotors into the balanced positions is performed under the control of the computer.

3. The method as claimed in claim 1 wherein the visible markings are produced on the rotor by a laser device, which is controlled by the computer.

4. The method as claimed in claim 1 wherein as the first or second visible marking, a line aligned with the axis of rotation of the rotor is projected.

5. The method as claimed in claim 1 wherein the visible markings are caused to appear in a flashing manner in a predetermined angular range preceding and following the balanced positions and in the balanced positions is continuous.

6. A method for dynamically balancing rotors comprising tool holders and/or tools of machining devices, in the case of which the size and direction of an imbalance of the rotor is ascertained in a computer of a balancing machine and balancing is performed by spreading apart first, second, third and fourth balancing elements the first and second balancing elements having a first predetermined degree of imbalance, and the third and fourth balancing elements having a second predetermined degree of imbalance, by movement into corresponding positions of adjustment, wherein:

(a) the size of the imbalance of the respectively employed pair of balancing elements is supplied to the computer;

(b) from the measured imbalance of the rotor and the size of the imbalance of the balancing elements the positions of adjustment of the balancing elements is ascertained;

(c) the rotor is turned in the balancing machine until a first balance position is reached, at which the adjustment position of the first balancing element is at a predetermined position in relation to the balancing machine;

(d) a first visible marking is projected onto the first balancing element, when the rotor is located in the first balance position;

(e) the first balancing element is set in a position of adjustment by bringing a mark provided on the first balancing element into alignment with the first visible marking; and wherein (f) the rotor is again turned in the balancing machine until a second balance position is reached, at which the adjustment position of the second balancing element is at a predetermined position in relation to the balancing machine;

(g) a second visible marking is projected onto the second balancing element, when the rotor is located in the second balance position;

(h) the second balancing element is set in a position of adjustment by bringing a mark provided on the second balancing element into alignment with the second visible marking; and wherein (i) the rotor is turned in the balancing machine until a third balance position is reached, at which the adjustment position of the third balancing element is at a predetermined position in relation to the balancing machine;

(j) a third visible marking is projected onto the third balancing element, when the rotor is located in the third balance position;

(k) the third balancing element is set in a position of adjustment by bringing a mark provided on the third balancing element into alignment with the third visible marking; and wherein (l) the rotor is again turned in the balancing machine until a fourth balance position is reached, at which the adjustment position of the fourth balancing element is at a predetermined position in relation to the balancing machine;

(m) a fourth visible marking is projected onto the fourth balancing element, when the rotor is located in the fourth balance position;

(n) the fourth balancing element is set in a position of adjustment by bringing a mark provided on the fourth balancing element into alignment with the fourth visible marking.

7. The method as claimed in claim 6, wherein rotation of the rotors into the balanced positions is performed under the control of the computer.

8. The method as claimed in claim 6, wherein the visible marking are produced on the rotor by a laser device, which is controlled by the computer onto the rotor.

9. The method as claimed in claim 6, wherein as the first, second, third or fourth visible marking, a line aligned with the axis of rotation of the rotor is projected.

10. The method as claimed in claim 6, wherein the visible markings are caused to appear in a flashing manner in a predetermined angular range preceding and following the balanced positions and in the balanced position are continuous.

11. The method as claimed in claim 6, wherein the first and second visible markings are arranged angularly offset in relation to the third and fourth visible markings, preferably by 60°.

12. The method as claimed in claim 6, wherein the first and second visible markings have one color and the third and fourth visible markings have a different color.

13. An apparatus for balancing rotors comprising tool holders and/or tools of machining devices, in the case of which the size and direction of an imbalance of the rotor is ascertained in a computer of a balancing machine and balancing is performed by spreading apart a first and a second balancing element with a predetermined degree of imbalance by movement into corresponding positions of adjustment, wherein:

(a) the size of the imbalance of the respectively employed pair of balancing elements is supplied to the computer;

(b) from the measured imbalance of the rotor and the size of the imbalance of the balancing elements the positions of adjustment of the balancing elements is ascertained;

(c) the rotor is turned in the balancing machine until a first balance position is reached, at which the adjustment position of the first balancing element is at a predetermined position in relation to the balancing machine;

(d) a first visible marking is projected onto the first balancing element, when the rotor is located in the first balance position;

(e) the first balancing element is set in a position of adjustment by bringing a mark provided on the first balancing element into alignment with the first visible marking; and wherein (f) the rotor is again turned in the balancing machine until a second balance position is reached, at which the adjustment position of the second balancing element is at a predetermined position in relation to the balancing machine;

(g) a second visible marking is projected onto the second balancing element, when the rotor is located in the second balance position;

(h) the second balancing element is set in a position of adjustment by bringing a mark provided on the second balancing element into alignment with the second visible marking; wherein (i) the apparatus includes a marking device which projects said visible markings which under the control of the computer onto the balancing elements, when the rotor is located in said balance positions, at which the positions of adjustment of the balancing elements are in a predetermined position in relation to the balancing machine.

14. The apparatus as claimed in claim 13, wherein the marking device includes a laser.

15. The apparatus as claimed in claim 14, wherein the laser is adapted to project a marking line on the rotor, said line coinciding with the rotor axis.

16. The apparatus as claimed in claim 13, wherein the balancing elements are balancing rings which possess a first mark at the position of the imbalance.

17. The apparatus as claimed in claim 16, wherein the balancing rings possess a second mark, which is offset by 180° in relation to the first mark.

18. The apparatus as claimed in claim 13, wherein the balancing elements bear lettering to indicate the maximum imbalance of the balancing element or of both balancing elements of a pair and preferably in gr/mm.

19. An apparatus for dynamically balancing rotors in two balancing planes comprising tool holders and/or tools of machining devices, in the case of which the size and direction of an imbalance of the rotor is ascertained in a computer of a balancing machine and balancing is performed by spreading apart a first and a second balancing element with a predetermined degree of imbalance by movement into corresponding positions of adjustment, wherein:

(a) the size of the imbalance of the respectively employed pair of balancing elements is supplied to the computer;

(b) from the measured imbalance of the rotor and the size of the imbalance of the balancing elements the positions of adjustment of the balancing elements is ascertained;

(c) the rotor is turned in the balancing machine until a first balance position is reached, at which the adjustment position of the first balancing element is at a predetermined position in relation to the balancing machine;

(d) a first visible marking is projected onto the first balancing element, when the rotor is located in the first balance position;

(e) the first balancing element is set in a position of adjustment by bringing a mark provided on the balancing element into alignment with the first visible marking; and wherein (f) the rotor is again turned in the balancing machine until a second balance position is reached, at which the adjustment position of the second balancing element is at a predetermined position in relation to the balancing machine;

(g) a second visible marking is projected onto the second balancing element, when the rotor is located in the second balance position;

(h) the second balancing element is set in a position of adjustment by bringing a mark provided on the second balancing element into alignment with the second visible marking; wherein (i) the rotor is turned in the balancing machine until a third balance position is reached, at which the adjustment position of the third balancing element is at a predetermined position in relation to the balancing machine;

(j) a third visible marking is projected onto the third balancing element, when the rotor is located in the third balance position;

(k) the third balancing element is set in a position of adjustment by bringing a mark provided on the third balancing element into alignment with the third visible marking; and wherein (l) the rotor is again turned in the balancing machine until a fourth balance position is reached, at which the adjustment position of the fourth balancing element is at a predetermined position in relation to the balancing machine;

(m) a fourth visible marking is projected onto the fourth balancing element, when the rotor is located in the fourth balance position;

(n) the fourth balancing element is set in a position of adjustment by bringing a mark provided on the fourth balancing element into alignment with the fourth visible marking; the apparatus includes two marking devices one marking device for each balancing plane, which said marking devices project said visible markings under the control of the computer onto the balancing elements, when the rotor is located in a said balance positions, at which the positions of adjustment of the balancing elements are in a predetermined position in relation to the balancing machine.

20. The apparatus as claimed in claim 19, wherein the marking devices include lasers.

21. The apparatus as claimed in claim 20, wherein the lasers are adapted to project marking lines on the rotor, said lines coinciding with the rotor axis.

22. The apparatus as claimed in claim 19, wherein the marking device for the two balancing planes are arranged in an offset angle in relation to one another.

23. The apparatus as claimed in claim 22, wherein the offset angle is 60 °.

24. The apparatus as claimed in claim 19, wherein the marking devices are adapted to radiate light with different colors.

25. The apparatus as claimed in claim 19, wherein the balancing elements are balancing rings which possess a first mark at the position of the imbalance.

26. The apparatus as claimed in claim 25, wherein the balancing rings possess a second mark, which is offset by 180 in relation to the first mark.

27. The apparatus as claimed in claim 19, wherein the balancing elements bear lettering to indicate the maximum imbalance of the balancing element or of both balancing elements of a pair and preferably in gr/mm.

* * * * *

UNITED STATES PATENT AND TRADEMARK OFFICE
CERTIFICATE OF CORRECTION

| | |
|---|---|
| PATENT NO. | : 6,250,155 B1 |
| APPLICATION NO. | : 09/214488 |
| DATED | : June 26, 2001 |
| INVENTOR(S) | : Hofmann et al. |

It is certified that error appears in the above-identified patent and that said Letters Patent is hereby corrected as shown below:

On the face of the patent, Under Item (12) and (75) please delete:

"~~Dionys~~ Hormann"

and insert:

--~~Dionys~~ Hofmann--

Signed and Sealed this

Twenty-seventh Day of January, 2009

JOHN DOLL
*Acting Director of the United States Patent and Trademark Office*